United States Patent [19]
Kaczeus et al.

[11] Patent Number: 5,886,850
[45] Date of Patent: Mar. 23, 1999

[54] HIGH CAPACITY, LOW PROFILE DISK DRIVE SYSTEM

[75] Inventors: Steven Louis Kaczeus; William Nicholas Thanos; James Drury Fahey, all of San Jose, Calif.

[73] Assignees: TEAC Corporation, Tokyo, Japan; DZU Corporation, Sunnyvale, Calif.

[21] Appl. No.: 441,671

[22] Filed: May 15, 1995

Related U.S. Application Data

[63] Continuation of Ser. No. 273,468, Jul. 11, 1994, abandoned, which is a continuation of Ser. No. 764,590, Sep. 24, 1991, abandoned.

[51] Int. Cl.⁶ .......................... G11B 5/012; G11B 33/14
[52] U.S. Cl. ................................................ 360/97.01
[58] Field of Search ........................ 360/97.01, 97.02, 360/97.03, 98.01, 98.02, 98.03, 98.05, 903

[56] References Cited

U.S. PATENT DOCUMENTS

| | | | |
|---|---|---|---|
| 4,034,411 | 7/1977 | Kraemer et al. | 360/98 |
| 4,130,845 | 12/1978 | Kulma | 360/97 |
| 4,280,155 | 7/1981 | Scott et al. | 360/98 |
| 4,405,100 | 9/1983 | Daniels | 244/3.1 |
| 4,568,988 | 2/1986 | McGinlay et al. | 360/77 |
| 4,636,905 | 1/1987 | Morimoto et al. | 360/37 |
| 4,639,863 | 1/1987 | Harrison et al. | 364/200 |
| 4,660,110 | 4/1987 | Iida et al. | 360/98 |
| 4,666,739 | 5/1987 | Roubal | 427/97 |
| 4,712,146 | 12/1987 | Moon et al. | 360/97.03 |
| 4,724,495 | 2/1988 | Hedberg et al. | 360/22 |
| 4,750,152 | 6/1988 | Yonekubo et al. | 369/46 |
| 4,790,912 | 12/1988 | Hotzman et al. | 204/15 |
| 4,810,333 | 3/1989 | Gulla et al. | 204/15 |
| 4,858,034 | 8/1989 | Hassel et al. | 360/51 |

(List continued on next page.)

FOREIGN PATENT DOCUMENTS

| | | |
|---|---|---|
| 0 161 720 | 9/1982 | European Pat. Off. . |
| 0-373-043 | 6/1990 | European Pat. Off. . |
| 0-534-745-A2 | 3/1993 | European Pat. Off. . |
| 0-534-745-A3 | 3/1993 | European Pat. Off. . |
| 0-555-913-A2 | 8/1993 | European Pat. Off. . |
| 0-589-708-A2 | 3/1994 | European Pat. Off. . |
| A-03 150 778 | 8/1989 | Japan . |
| 3-62389 | 3/1991 | Japan ................................ 360/97.01 |
| A-2 051 458 | 5/1980 | United Kingdom . |

OTHER PUBLICATIONS

Research Disclosure No. 302 "Insertion and Removal of Cards With Power on While Not Disturbing the Rest of The Machine", Jun. 1989; anonymous.

IEEE Transactions on Components, Hybrids, and Manufacturing Technology, vol. 11, No. 4, Dec. 1988, New Your, pp. 576–584, XP105724, *Flow Visualization and Special Measurements in a Simulated Rigid Disk Drive*, Abrahamson, Koga & Eaton.

I–Therm 88 (Intersociety Conference on Thermal Phenomena in the Fabricationand Operation of Electronic Components) ,11 May 1988, Los Angeles, GA, pp. 162–170, XP11602, *Flow and Thermal Fields in Channels Between Corotating Disks*, Torok & Gronseth.

(List continued on next page.)

*Primary Examiner*—David L. Ometz
*Attorney, Agent, or Firm*—Brinks Hofer Gilson & Lione

[57] ABSTRACT

A disk drive system provides a low height device by mounting a circuit board or boards containing the electronic circuitry in the same enclosure with the head-disk assembly (HDA). The drive actuator mechanism is positioned at one side of one end of the enclosure and the circuit board or boards are positioned at the other side of that end of the enclosure. A gasket seals the HDA from contaminants, while the enclosure protects the electronic circuitry and cables from physical damage, electrostatic charges and electromagnetic interference. The circuit board or boards can be removed from the enclosure without removing the entire disk drive from the using system, and the entire drive assembly can readily be removed from the using system for replacement or use in another system.

12 Claims, 6 Drawing Sheets

U.S. PATENT DOCUMENTS

| | | | |
|---|---|---|---|
| 4,920,434 | 4/1990 | Brown et al. | 360/77.08 |
| 4,930,029 | 5/1990 | Morita | 360/97.01 |
| 4,931,899 | 6/1990 | Osefune | 360/78.07 |
| 4,933,785 | 6/1990 | Morehouse et al. | 360/78.04 |
| 4,965,684 | 10/1990 | Stefansky | 360/97.01 |
| 4,991,129 | 2/1991 | Swartz | 364/707 |
| 4,992,899 | 2/1991 | Kaczeus et al. | 360/106 |
| 5,010,426 | 4/1991 | Krenz | 360/97.01 |
| 5,025,335 | 6/1991 | Stefansky | 360/97.01 |
| 5,025,336 | 6/1991 | Morehouse et al. | 360/97.02 |
| 5,027,242 | 6/1991 | Nishida et al. | 360/106 |
| 5,031,059 | 7/1991 | Yamaguchi et al. | 360/97.03 |
| 5,038,239 | 8/1991 | Vettel et al. | 360/98.01 |
| 5,041,924 | 8/1991 | Blackborrow et al. | 360/69 |
| 5,046,149 | 9/1991 | Nunan | 307/10.1 |
| 5,073,834 | 12/1991 | Best et al. | 360/77.08 |
| 5,077,722 | 12/1991 | Geist et al. | 369/75.1 |
| 5,079,655 | 1/1992 | Yagi | 360/97.02 |
| 5,095,396 | 3/1992 | Putnam et al. | 360/106 |
| 5,140,478 | 8/1992 | Yoshida | 360/97.01 |
| 5,170,299 | 12/1992 | Moon | 360/77.08 |
| 5,204,593 | 4/1993 | Ueki | 318/254 |
| 5,208,712 | 5/1993 | Hatch et al. | 360/98.01 |
| 5,210,660 | 5/1993 | Hetzler | 360/51 |
| 5,210,854 | 5/1993 | Beaverton et al. | 395/500 |
| 5,212,679 | 5/1993 | Tohkairin | 369/75.2 |
| 5,229,919 | 7/1993 | Chen | 361/391 |
| 5,243,479 | 9/1993 | Nakagoshi et al. | 360/98.01 |
| 5,251,082 | 10/1993 | Elliott et al. | 360/903 |
| 5,262,705 | 11/1993 | Hattori | 318/479 |
| 5,263,003 | 11/1993 | Cowles et al. | 365/230.03 |
| 5,282,099 | 1/1994 | Kawagoe et al. | 360/97.01 |
| 5,283,704 | 2/1994 | Reidenbach | 360/97.01 |
| 5,291,355 | 3/1994 | Hatch et al. | 360/97.01 |
| 5,291,584 | 3/1994 | Challa et al. | 395/500 |
| 5,329,412 | 7/1994 | Stetansky | 360/97.01 |
| 5,329,491 | 7/1994 | Brown et al. | 365/226 |
| 5,337,202 | 8/1994 | Jabbarai et al. | 360/97.01 |
| 5,345,352 | 9/1994 | Nakano | 360/97.01 |
| 5,532,889 | 7/1996 | Stefansky et al. | 360/97.01 |

OTHER PUBLICATIONS

Aerodynamics of Disk Drives; R. Lennemann; Mar. 12, 1974.

High–Performance PC XT/AT Disk controller; Apr. 1992, Cirrus Logic, CL–SH3G0.

Point 5: A New Concept in Data Storage; Kalok Corp.; 1993.

"Multichip Module: Systems Advantages, Major Construction, and Material Technologies", edited by R. Wayne Johnson et al., IEE Press selected Reprint Series, Institute of Electrical and Electronics Engineers, Inc. 1990, pp. 1–4.

Dr. Maurice G. Sage, "Future of Multichip Modules In Electronics", Proc. NEPCOM West '89, pp. 14–20.

John D. Balde, "New Packaging Strategy to Reduce System Costs", IEEE Trans. Components, Hybrids, Manuf. Technol., vol. DHMT–7, No. 3, Sep. 1984, pp. 7–10.

Hardcard. The Inside Story; Plus Development Corp., 1778 McCarthy Boulevard, Milpitas, California 95035–7421.

HIGH CAPACITY, LOW PROFILE DISK DRIVE SYSTEM

This application is a continuation of application Ser. No. 08/273,468, filed Jul. 11, 1994 abandoned, which is a continuation of application Ser. No. 07/764,590, filed Sep. 24, 1991 abandoned.

BACKGROUND

1. Field of the Invention

This invention relates to disk drive systems, and relates more particularly to such disk drive systems having a low height or profile, improved serviceability, reliability and removability without sacrificing capacity or performance.

2. Prior Art

Over the past ten years, disk drive devices for use in computer systems have been dramatically shrinking in size. One of the factors responsible for this rapid progress has been the ability to reduce the space required to house the electronic components of the devices, made possible principally through very large scale integration of the electronic circuitry. Additionally, substantial advances have been made in reducing the size of the major mechanical components of disk drive devices such as the motor which rotates the disk or disks, the flexure mounting mechanism for the read/write heads and the actuator mechanism which moves the heads to different track positions on the disk surfaces.

With the increasing popularity of portable, laptop, notebook and smaller desktop personal computers employing disk drives, the pressure to reduce the volume of the disk drive enclosure without sacrificing the capacity, performance and cost of the storage device is significant. A hard disk drive manufacturer must supply a product having a very high linear bit density and radial track density in a device that is resistant to shock and vibration, is temperature and environment tolerant, is producible in high volume at a reasonable cost, has high throughput performance, and has a storage capacity that meets the increasing data storage requirements of the computer system market. In most small computer systems, the size of the keyboard and the visual display or monitor will dictate the mandatory X and Y dimensions for the system. This means that the most critical disk drive dimension that can be controlled is the height or Z dimension of the drive.

The relatively recent introduction of 2.5 inch and 1.8 inch "form factor" disk drives has been a response to this demand for high capacity, low volume storage for the smaller types of computers. Representative examples of prior art disk drive designs directed to the 2.5 inch and 1.8 inch form factor drives are the following.

U.S. Pat. No. 5,025,335, Stefansky, shows a disk drive employing a 2.5 inch disk in a housing whose length is described as equal to the width of a conventional 3.5 inch disk drive (4 inches) and whose width is approximately one half the length of a 3.5 inch drive (2.75 inches). In an embodiment with one disk in the housing, the height of the unit is 0.68 inches, with a printed circuit board containing the drive electronics mounted adjacent to and outside the bottom of the housing.

U.S. Pat. No. 5,025,336, Morehouse et al, discloses a reduced height disk drive with a single 2.5 inch disk therein, the drive housing having a width of approximately 2.8 inches, a length of approximately 4.0 inches and an overall height no greater than 0.63 inches. The patent attributes this reduced height to the use in the disk enclosure of disk spin motors, actuators and head flexures of smaller height. This drive utilizes a printed circuit board with the drive electronics therein disposed below the base which supports the disk and actuator and outside the disk enclosure.

U.S. Pat. No. 4,933,785, Morehouse et al, shows a drive containing at least two 2.5 inch disks therein, with the printed circuit board containing the device electronics mounted below and spaced from the disk enclosure.

U.S. Pat. No. 5,038,239, Vettel et al., discloses a disk drive in which the electronic circuits are disposed mounted on a number of circuit cards which are mounted in different areas in the drive housing, with interconnections between the multiplicity of cards.

SUMMARY OF THE INVENTION

The present invention provides a very low height disk drive by locating the circuit board or boards containing the drive electronics in the same enclosure which contains the head-disk assembly (HDA). In the case of a drive having a single disk therein, the electronic circuitry board is disposed in substantially the same plane as the plane of the single disk. In the case of multiple disks in a drive enclosure, the electronic circuitry board is disposed in a plane between the planes of the surfaces of two of the disks. This low profile is made possible, in part, by locating the drive actuator mechanism near the side and at one end of the drive enclosure, thereby leaving space in the enclosure to mount the circuit board in the space adjacent to the actuator.

In the prior art disk drives discussed above, the printed circuit board or boards are placed above or below, or both above and below, the disk or disks, outside the drive enclosure. This results in problems with electrostatic charges which may be placed on the electronic components as a result of human hands touching the components when inserting or removing the disk drive assembly from its mounting in the using computer.

In the present invention, placement of all of the electronic components; inside the small sealed enclosure totally protects the electronic components from damage from human handling. This design configuration results in a cartridge-like device with a compact, smooth rectangular configuration, making it very suitable for use as a removable type device, without any modification. At the same time, this invention provides for mounting of the printed circuit board or boards in the enclosure in a manner which permits its or their removal therefrom for replacement or repair without the need to remove the entire disk drive assembly from the computer.

Additionally, by mounting the flexible cables associated with the circuit board totally within the enclosure, the circuits in these cables are shielded from external electromagnetic interference (EMI). Further, the HDA is placed in a separate sealed compartment inside the enclosure to prevent contaminants from reaching the disk surfaces and causing head crashes.

The disk storage device of this invention can be used in workstations, desktop and portable computers, notebooks and peripheral devices such as facsimile machines, laser printers, oscilloscopes, instruments, etc., where minimum dimensional volume is critical, but where no degradation of capacity, performance and/or cost is allowed.

The present invention provides an extremely thin disk drive, with a 0.350-inch high profile for a single disk enclosure, a 0.500-inch high profile for a two disk enclosure, 0.750-inch high profile for a four disk configuration and a 1.00 inch high profile for a six disk configuration. In representative configurations utilizing 3.5 inch disks, the disk drive system of this invention may have a width of approximately 4 inches and a length of approximately 5.75 inches regardless of the number of disks utilized in the enclosure. An embodiment of this invention having two 3.5 inch disks therein weighs approximately 30 ounces, while a similar version utilizing magnesium parts for the housing weighs approximately 8 ounces.

When 3.5 inch disks are employed in the invention, a formatted capacity of 240 megabytes (MB) is obtained with a two disk embodiment, a formatted capacity of 120 MB is obtained with a one disk embodiment, and a formatted capacity of 480 MB results from a four disk configuration. If 2.5 inch or 1.8 inch diameter disks are employed using the configuration of the present invention, comparable low profiles can be obtained.

DESCRIPTION OF THE PREFERRED EMBODIMENT

Figure 1:
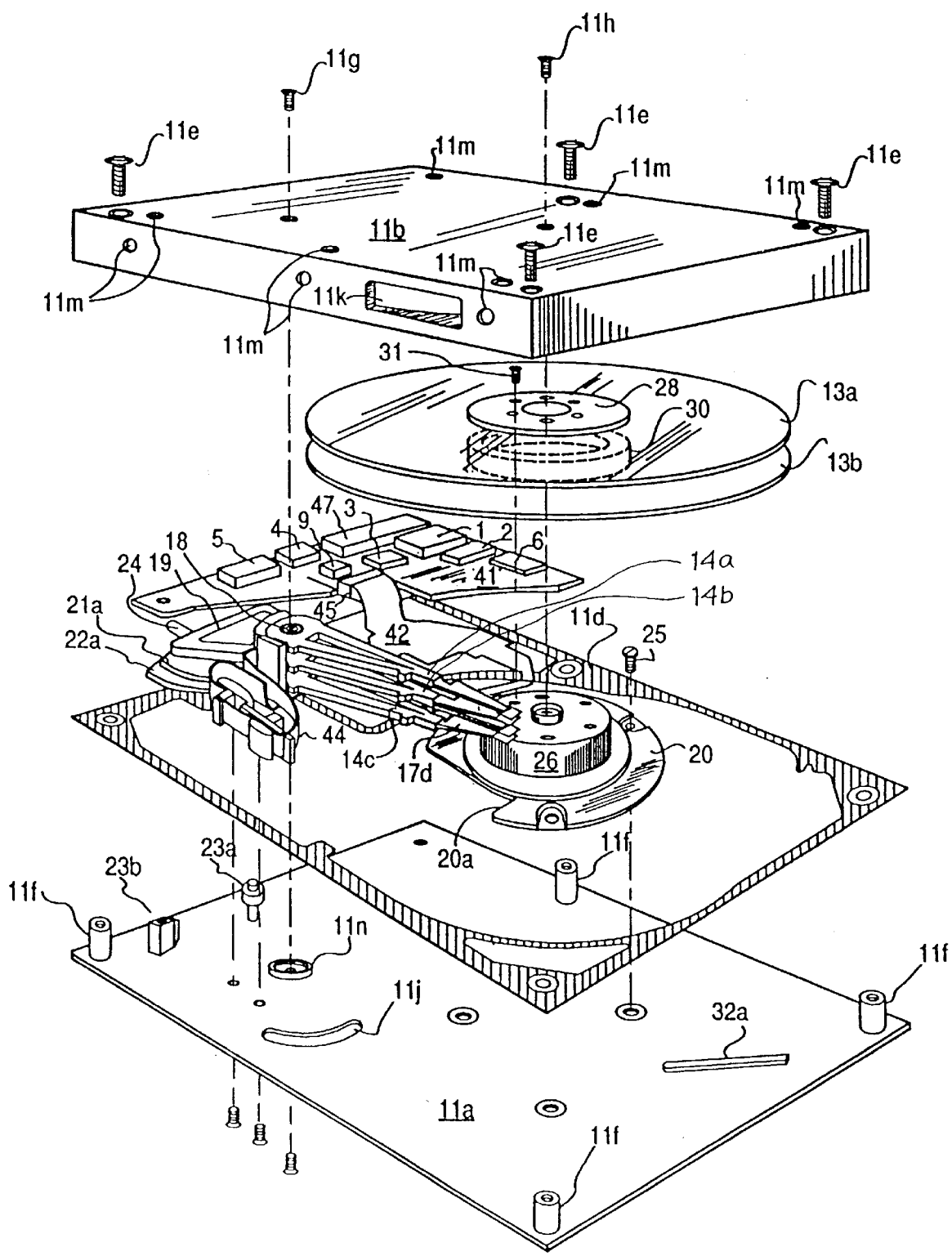
FIG. 1 is an exploded perspective view showing the major components of the disk drive of this invention employing two (risks.

The exploded perspective view of FIG. 1 shows a disk drive system in accordance with this invention employing two recording disks. The drive system is mounted in an enclosure 11 having a base member 11a on which the main elements of the drive are mounted. Within enclosure 11 are mounted a pair of disks 13a, 13b, and an actuator assembly including three actuator arms 14a, 14b, 14c which carry flexure members 17a, 17b, 17c and 17d to support transducing heads at the ends thereof for reading and writing on the concentric tracks on the recording surfaces of disks 13a, 13b. As been shown in FIG. 5, upper arm 14a carries a head 16a mounted on flexure member 17a for reading and writing on the upper surface of disk 13a, while lower arm 14c carries a head 16d on a flexure 17d for reading and writing on the lower surface of disk 13b. Arm 14b carries a pair of heads 16b, 16c on flexures 17b, 17c for reading and writing on the lower surface of disk 13a and the upper surface of disk 13b, respectively.

Figure 2:
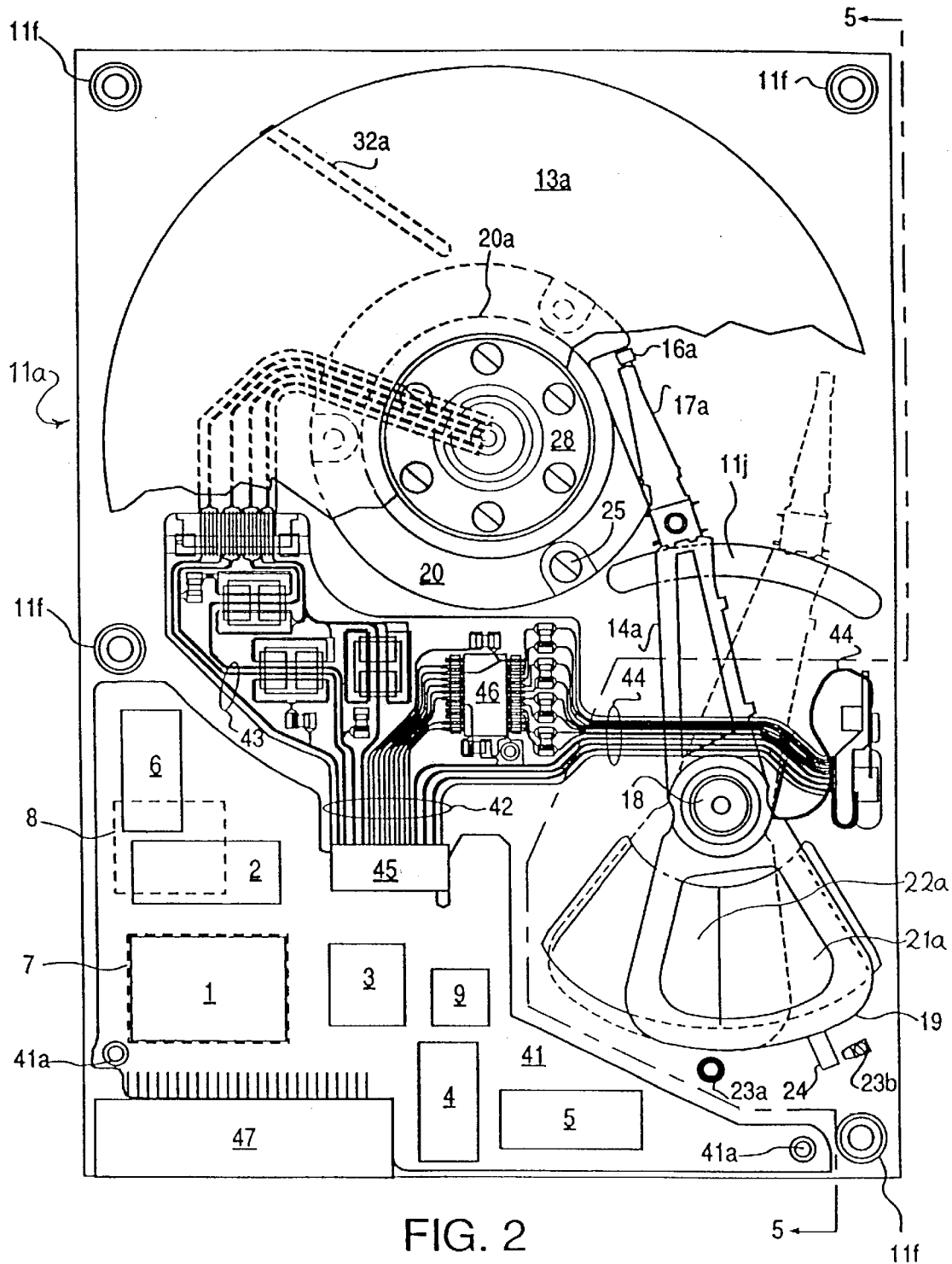
FIG. 2 is a top plan view, partially cut away and with the enclosure cover removed, of the disk drive shown in FIG. 1.

Referring again to FIG. 1, arms 14a, 14b, 14c move as a unit in an arcuate or rotary motion around a pivot journal 18 in response to the electromagnetic interaction between a current-carrying coil 19 and a pair of permanent magnetic members 21a, 21b. Magnet 21a, as best seen in FIG. 2, is secured to a mounting plate 22a which in turn is fixed to base 11a, while magnet 21b (FIG. 3) is secured to a mounting plate 22b which is fixed to top cover 11b. When top cover 11b is secured to base 11a to form a sealed enclosure, magnets 21a, 21b are positioned on opposite sides of coil 19 and suitably polarized to provide the required flux direction to interact magnetically with coil 19 and produce motion of the actuator. By mounting magnets 21a, 21b directly to the bottom and top members of the housing, there is no need for the use of standoff spacers to separate and support the magnets as in many prior art disk drives.

The actuator mechanism is positioned on base member 11a in a raised shoulder portion 11n and is secured to member 11a by a screw extending through an opening in member 11a and engaging a tapped opening in the bottom of the actuator mechanism.

Coil 19 is mounted on the actuator on the side of journal 18 opposite to that of arms 14a, 14b, 14c. As is well known in the art, the actuator operates to move heads 16a, 16b, 16c and 16d to different radial track positions relative to the surfaces of disks 13a, 13b in response to positioning signals; supplied to coil 19. Two crash-stop members 23a, 23b are located on either side of coil 19 at the extreme limits of desired movement of the actuator. A magnetic pin 24 attached to coil 19 and extending therefrom engages pin 23a or 23b at the limit of actuator travel in each direction to act as a physical stop. Stop member 23a includes a resilient material to absorb the impact from pin 24 when coil 19 moves to the extreme outer position. Magnetic pin 24 member also is magnetically attracted to metal stop member 23b when adjacent thereto to magnetically latch the actuator in a "parked" position, as is well known in the art.

Disks 13a, 13b are rotated by a spindle motor 26 which is mounted on a flange 20 which in turn is anchored to base 11a by screws 25. Flange 20 has a cut out portion 20a underlying head 16d and flexure 17d to permit free movement of these elements across the lower surface of disk 13b. In one embodiment, two 0.0315-inch thick thin film magnetic (disks 13a, 13b are mounted for rotation by the spindle motor and are separated by a spacer ring 30. The two disks are rigidly mounted on the spindle by a disk clamp 28 which is secured to the upper surface of spindle motor 13 by screws 31.

In accordance with a major feature of this invention, the majority of the electronic circuitry for the disk drive is mounted on both sides of a single circuit board which is disposed in the same envelope as the disks in the enclosure. As best seen in FIG. 2, this printed circuit board 41 contains a number of electric components mounted on both sides of the board. The electronic components of the disk drive system on one side of board 41 are represented in FIGS. 1 and 2 by reference numerals 1–6 and 9, and those on the other side of board 41 are shown in dotted outline in FIG. 2 as elements 7 and 8. The function of these components will be discussed in detail below in connection with FIG. 7.

From FIGS. 1 and 2 it can be seen that the layout of the disk drive system of this invention is configured such that, unlike prior art disk drives, the actuator mechanism of the drive is positioned near one side and at one end of base 11a, thereby resulting in sufficient space in which to locate board 41 near that one end and at the other side of base 11a. This is a major feature of this invention in that it permits board 41 to be positioned in the same envelope as the disks and in essentially the same plane as the disk in the case of a one disk embodiment shown in FIG. 6, or in a plane between disks 13a, 13b in the case of a two disk embodiment illustrated in FIGS. 1 and 5, thereby resulting in the very low height profile of the drive system. This permits obtaining the very thin envelope or (enclosure necessary for many small computer devices, without sacrificing capacity, performance, or price.

In accordance with this invention, the different electronic components on board 41 are positioned in proximity to the elements in the drive to which they relate. For example, component 5 on board 41 may be a circuit for controlling the disk drive actuator and it can be seen that this component is positioned closely adjacent coil 19 of the actuator mechanism. Similarly, circuit components 3 and 4 on board 41 contain analog read/write circuitry for processing signals to and from read/write heads 16. The digital portion of the electronic circuitry on the upper surface of board 41 includes component 1 for processing digital signals present in the disk drive system. A feature of the invention is that component 7, located on the underside of board 41 and also containing digital processing circuitry, is aligned physically on board 41 with component 1, as represented by the dashed outline of component 7 in FIG. 2, so as to minimize the path length between components 1 and 7 and facilitate their interconnection.

As seen in FIG. 2, circuit board 41 provides for supplying signals to the disk spindle motor 26, coil 19 of the actuator, and real/write heads 16 through a connector cable 42 which plugs into terminals in a member 45 in board 41. Signal cables from connector 42 may include a group of lines 43 which supply power to spindle motor 26, while another group of signal lines 44 are connected to the read/write heads and the actuator mechanism including coil 19. Signal lines 43 and 44 extend under the bottom of lower disk 13b to connect their respective circuits to the spindle motor and actuator mechanism, respectively.

The read/write portion of signal lines 44 preferably includes preamplifier circuitry in the form of a chip 46 for providing preamplification of the read signals from heads 16. After passing under disk 13b, signal lines 44 are in the form of a flexible cable which connects to coil 19 and heads 16. As shown in FIGS. 1 and 2, the flexible cable 44 is configured in a serpentine manner in this area to minimize the undesired torque produced on the actuator mechanism by the cable.

External electrical connections are made to the circuitry on board 41 through a connector block 47 which mates with an external connector cable (not shown) to provide for the interchange of signals between the disk drive system and the using system. By maintaining the flex cable within the drive enclosure, the cable is protected from damage which could otherwise occur during opening of the container in which the disk drive system is shipped. Additionally, by being disposed within the drive enclosure, the flex cable is shielded from EMI when the disk drive is in operation and signals are present in the conductors in the flex cable.

An air filter 33 is located in one corner of the cover 11b (FIG. 3) for maintaining a clean environment within the enclosure. This may be in the form of an air filter 33 through which air is forced in response to rotation of disks 13a, 13b. Filter 33 may be a container of low air resistance fiber sold under the name Filtrete Filter Media by Minnesota Mining & Manufacturing. To insure that the filter has optimum efficiency, the air pressure at the inlet side of the filter is increased relative to the filter outlet pressure. To accomplish this, a vane 32a (FIGS. 1 and 2), and vane 32b (FIG. 3), both of which are preferably formed as part of bottom portion 11a and enclosure cover 11b, respectively, are located in the air path. When bottom portion 11a and top cover 11b are assembled, vane members 32a, 32b are disposed opposite each other to direct air flow as represented by the arrows.

This configuration causes the air entering filter 31 at a pressure P1 to exceed the filter outlet pressure P2, thereby insuring maximum efficiency.

Cover 11b and base 11a are designed to hermetically isolate the HDA from the circuit board area by means of a continuous gasket 11d (FIGS. 1 and 3) which acts to seal the HDA area when cover 11b and base 11a are secured together by screws 11e which extend through cover 11b to engaged tapped supports 11f formed in base 11a.

Figure 3:
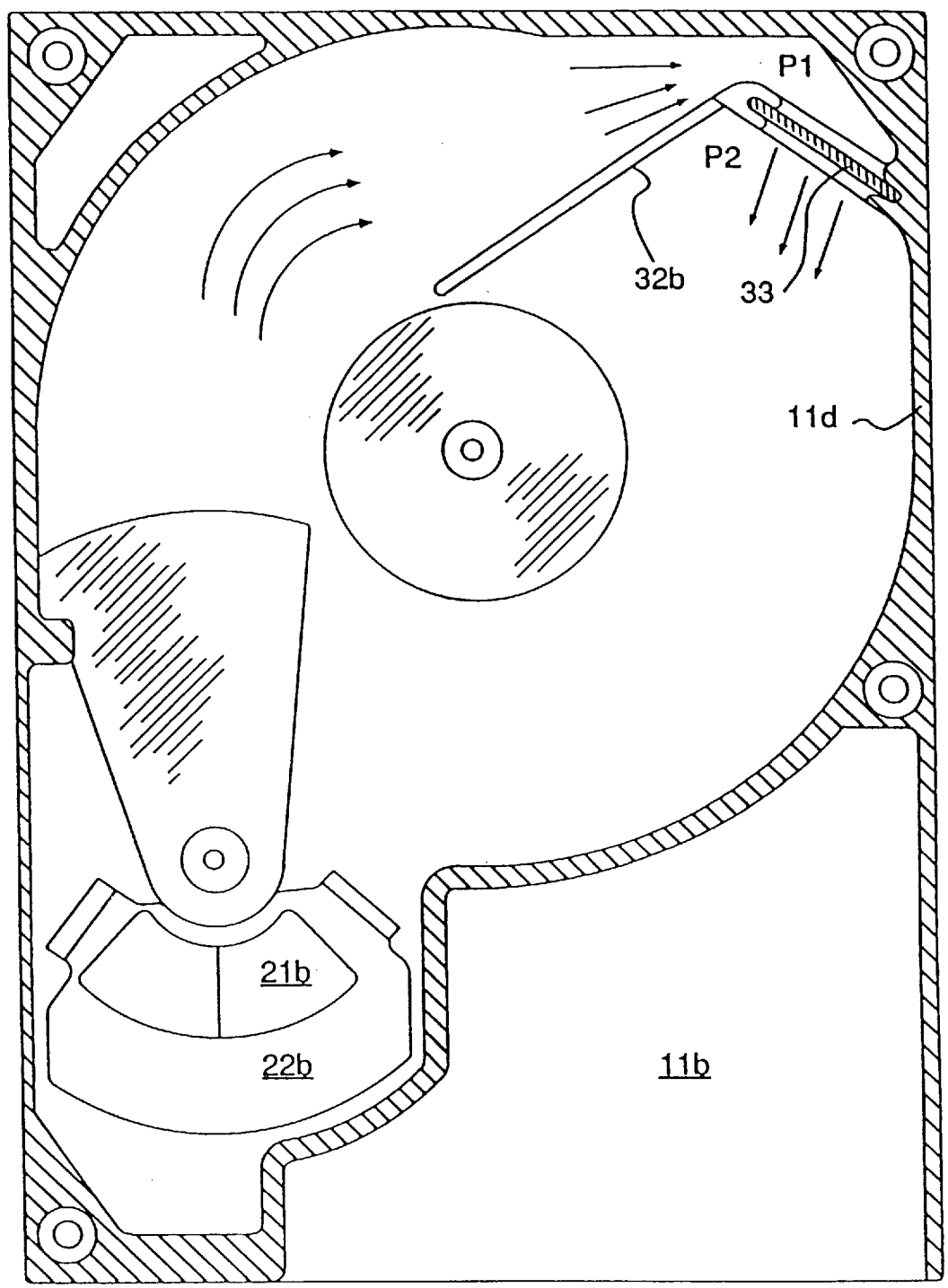
FIG. 3 is a bottom plan view of the cover for the disk enclosure.

When cover 11b is assembled on base 11a, the actuator mechanism and the disks and spindle motor may be anchored against tilt by screws 11g and 11h. Screw 11g extends through an opening in cover 11b to engage a tapped opening in the stationary portion around actuator pivot 18, while screw 11h similarly engages a tapped opening in the stationary center portion of spindle motor 26. As seen in FIG. 3, the portions of cover 11b above disk clamp 28 and the actuator mechanism may be slightly hollowed out to accommodate these elements.

An opening 11j in base 11a (FIGS. 1 and 2) is provided for access to transducers 16 during the trackwriting operation when the disk drive is initially assembled. A similar opening 11k is provided in top cover 11b (FIGS. 1 and 4) for access during trackwriting. After completion of the trackwriting operation, openings 11j and 11k are sealed to insure the hermetic seal of the HDA area.

To facilitate mounting the disk drive in a position desired by the user, pairs of tapped openings 11m are provided around the periphery of cover 11b. These openings do not extend through cover 11b and can be used for mounting screws to position the disk drive in a desired location in the using system.

Figure 4:
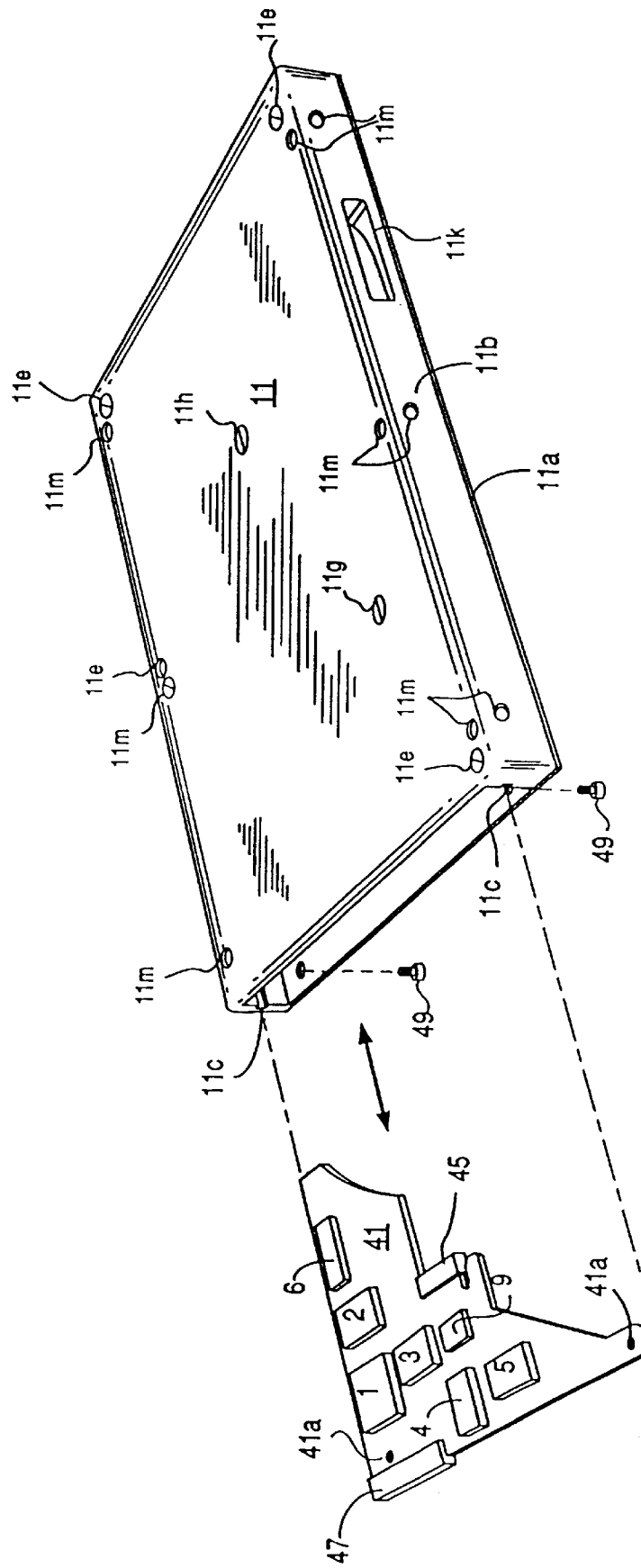
FIG. 4 is a perspective view of the assembled disk drive enclosure with the circuit board removed therefrom.

As shown in FIG. 4, circuit board 41 may be inserted in and removed from housing 11 without the need to disassemble the housing. Board 41 is guided into and supported in the housing by grooves 11c formed in the side walls of cover 11b. When board 41 is fully inserted, connector 45 mates with connector 42 in the housing to provide the necessary electrical connections. When inserted, board 41 is maintained in position by screws 49 which extend through openings in the corners of bottom member 11a to engage tapped openings 41a in board 41. Screws 49, when engaged, also serve the functions of anchoring the corners of bottom member 11a to the housing assembly and acting as an electrical ground connection.

For removal of board 41, screws 49 are removed and an opening (not shown) may be provided on the end of board 41 to permit a user to engage the opening with a tool and remove the board for replacement or repair. If desired, a hinged or otherwise movable door may be provided for the opening in housing 11 through which board 41 extends so as to close the housing when board 41 is inserted.

Figure 5:
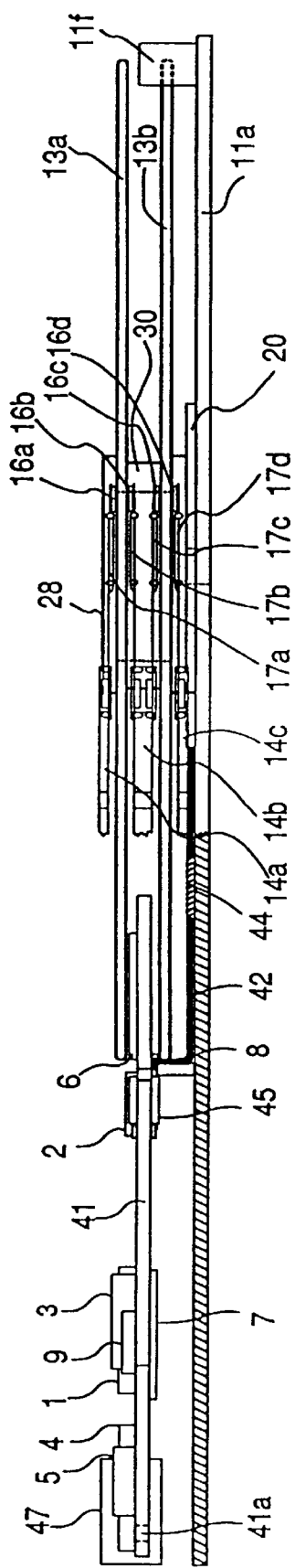
FIG. 5 is a side view, partly in cross section, along plane 5—5 of FIG. 2.
Figure 6:
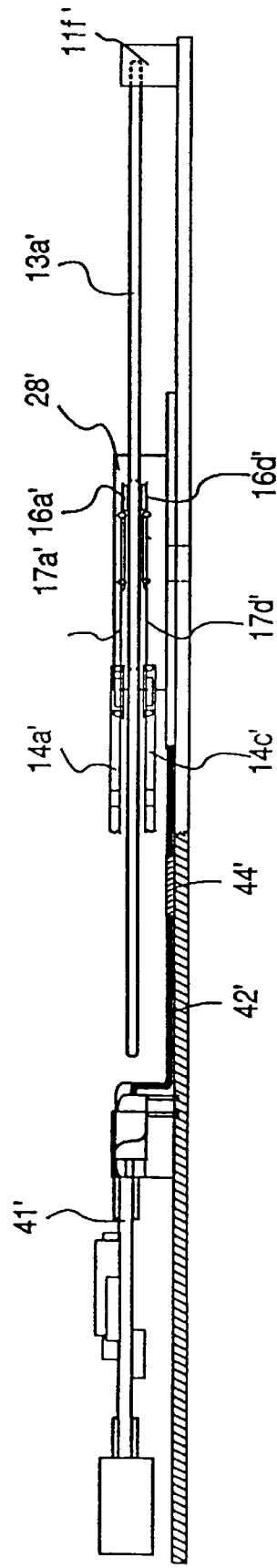
FIG. 6 is a cross sectional side view similar to FIG. 5 of an embodiment of the invention employing one disk.

FIG. 5 shows that in a two disk embodiment, board 41 is disposed in a plane between the planes of the recording surfaces of disks 13a and 13b. FIG. 6 illustrates an embodiment of the invention in a drive employing one disk. This embodiment employs a single disk 13a' having heads 16a', 16d' cooperating with its upper and lower surfaces, respectively. Except for the height of the actuator and disk spin motor and the reduced envelope height, the elements of this configuration are generally the same as those in the two disk embodiment of FIGS. 1–5. From FIG. 6 it can be seen that board 41' is disposed in essentially the same plane as the surface of single disk 13a'. Additionally, in the case of embodiments employing more than two disks, the circuit board can be positioned in a plane which is between the planes of the recording surfaces of the disks or can be aligned with the plane of the surface of one of the disks. This is in contrast to the prior art in which the circuit board or boards are positioned above or below, or both above and below, the plane or planes of the surfaces of the disks.

The embodiment described above for a disk drive incorporating two disks employed nine circuit chips mounted on board 41. As shown in the block diagram of FIG. 7, these chips may have the following functions. Chip 1 may provide the functions of a sequencer/error correction code (ECC) element, servo timing buffer controller and AT interface. Chip 2 provides random access memory which may be in the form of a static buffer RAM, type M51008VP manufactured by Mitsubishi. Chip 3 provides the read/write electronics control and may be a type Reach 1 manufactured by AT&T. Chip 4 is a synthesizer associated with read/write control chip 3 and of the type SC84038 manufactured by Sierra Semiconductor. Chip 5 provides positioning signals to the actuator voice coil motor (VCM) and may be of a type 8932 manufactured by Allegro Microsystems. Chip 6 provides the power to drive spindle motor 26 and may be of the type 8902 manufactured by Allegro Microsystems. Chip 7 is a microcontroller/servo processor type Z86C94 manufactured by Zilog Inc. Chip 8 is a firmware ROM of 32K bytes of any suitable type such as a 27C256 manufactured by Microchip. Chip 9 is a read/write filter type 8011 from Silicon Systems, Inc.

Figure 7:
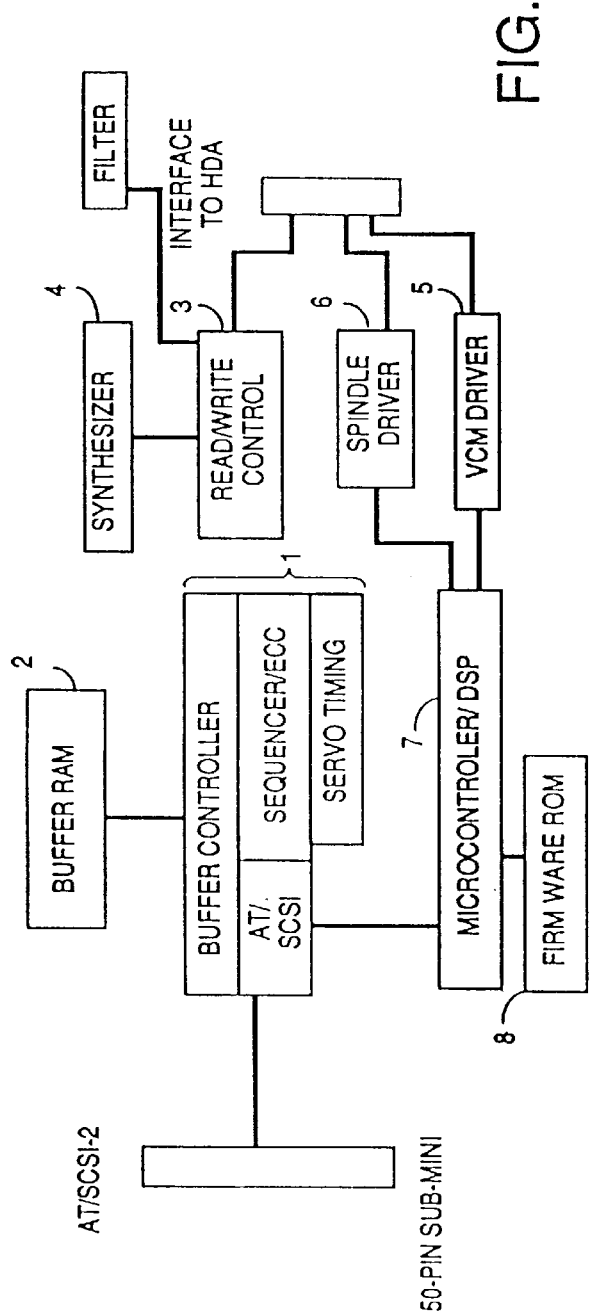
FIG. 7 is a block diagram of the circuit chip elements making up a nine chip embodiment of the invention.
Figure 8:
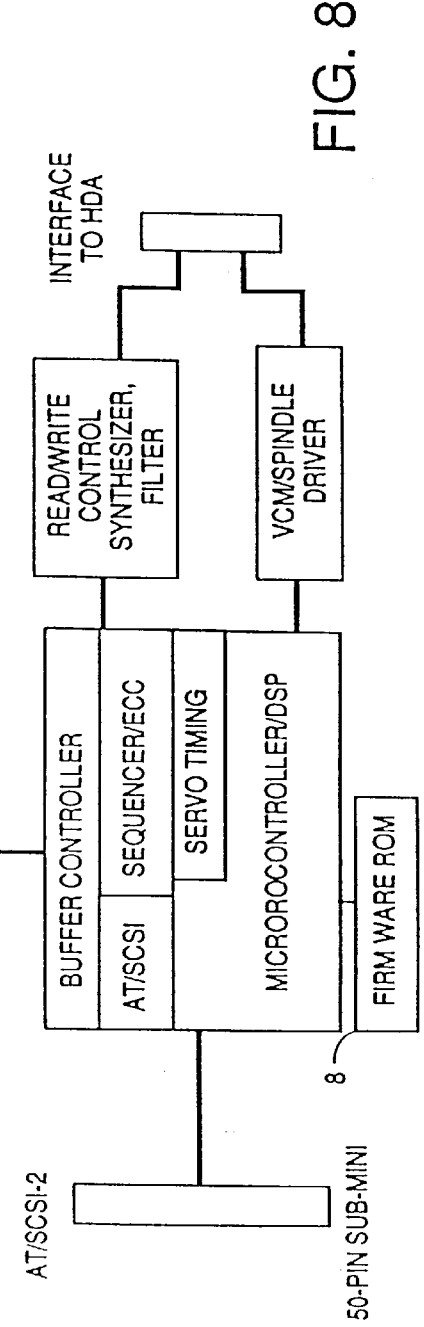
FIG. 8 is a block diagram of the circuit chip elements of an embodiment where a number of the functions of different chips in FIG. 7 have been integrated into a single chip.

However, as shown in the block diagram of FIG. 8, the number of chips required can be reduced by combining functions which were separately implemented in the embodiment of FIG. 7. By integration techniques, for example, the buffer RAM and the controller and microprocessor elements can be combined into a multi-chip module (MCM). Further, the functions of the spindle motor power chip 5 and the VCM actuator positioning current chip 6 can be combined into a single chip. Additionally, the function of the read/write control chip 3 and the synthesizer chip 4 can be merged into a single chip. Similarly, by further integration of functions into a multichip module, the total chip count can be reduced to three chips.

It will be seen that the structure of this invention provides a disk drive having an extremely low height or profile by virtue of the disposition of the printed circuit board in the same enclosure as the HDA and either in substantially the same plane as a disk in a single disk housing or located in a plane between the planes of the surfaces of the disks in a multi-disk housing. At the same time, the location of the circuit board within the enclosure housing protects the circuit components from handling damage and the buildup of electrostatic charges from human contact with the components. Further, the flex cable is protected by the enclosure housing from physical damage and from the effects of EMI.

The disk drive configuration of this invention provides many advantages over conventional disk drives of its type. The present drive may be employed as a single removable, replaceable drive in a notebook computer system or used as multiple drives in computer systems, such as laptops and desktops, which require larger data storage capacity than can be provided in a single 200 MB drive. Further, a single drive used in a notebook computer may be removed therefrom by a user and mounted for use in a laptop or desktop computer, thereby permitting the user to transfer data from one computer system to another with a minimum of time and effort.

We claim:

1. A disk drive assembly comprising:
    a three dimensional enclosure having a lateral form factor area defined between two side walls of the enclosure and a first end and a second end of the enclosure and a vertical thickness;
    a seal disposed within the enclosure, the seal defining a sealed volume and a circuit volume outside the sealed volume and within the enclosure;
    at least one disk disposed inside said sealed volume, said disk being rotatable in a plane;
    a disk spindle motor to rotate said at least one disk;
    a transducing head for transducing data from said at least one disk;
    a head actuator assembly disposed inside said enclosure at said first end of said enclosure;
    a printed circuit board assembly removably mounted in said circuit volume, in a plane substantially parallel to said plane in which said at least one disk is rotatable and adjacent laterally to said head actuator assembly at said first end of said enclosure and further wherein a top of said enclosure completely covers the printed circuit board assembly;
    electronics controlling said head actuator, said spindle motor and controlling the flow of data from said transducing head, said electronics mounted in close proximity in substantially the same plane on said printed circuit board assembly;
    a first connector connecting said electronics on said printed circuit board assembly to said transducing head and said actuator assembly; and
    a second connector mounted on said printed circuit board assembly along the first end opposite from the at least one disk and matable with a connector exterior to said disk drive assembly.

2. The disk drive assembly of claim 1 wherein the printed circuit board assembly is removable from said circuit volume of said enclosure without breaking the seal of said sealed volume.

3. The disk drive assembly of claim 1 wherein said second connector further comprises a connector block located in said first end opposite from the at least one disk and oriented outward therefrom.

4. The disk drive assembly of claim 1 wherein said three dimensional enclosure further includes a base member extending from said first end to said second end.

5. The disk drive assembly of claim 4 wherein said base member is directly adjacent and parallel to said printed circuit board assembly.

6. A disk drive assembly comprising:
    a three dimensional enclosure having a lateral form factor area defined between two side walls of the enclosure, a base member, and first and second ends of the enclosure and a vertical thickness, wherein said base member extends from said first end to said second end;
    a seal disposed within the enclosure, the seal defining a sealed volume and a circuit volume outside the sealed volume and within the enclosure;
    at least one disk disposed inside said sealed volume, said disk being rotatable in a plane which is parallel to said base member;
    a disk spindle motor to rotate said at least one disk;
    a transducing head for transducing data from said at least one disk;
    a head actuator assembly disposed inside said enclosure at said first end of said enclosure;
    a printed circuit board assembly disposed in said circuit volume, in a plane substantially parallel to said plane in which said at least one disk is rotatable and adjacent laterally to said head actuator assembly at said first end of said enclosure, said printed circuit board assembly directly adjacent and parallel to said base member and further wherein a top of said enclosure completely covers the printed circuit board assembly; and electronics controlling said head actuator, said spindle motor and controlling the flow of data from said transducing head, said electronics mounted in close proximity in substantially the same plane on said printed circuit board assembly.

7. The disk drive assembly of claim 6 wherein the printed circuit board assembly is removable from said circuit volume of said enclosure without breaking the seal of said sealed volume.

8. The disk drive assembly of claim 6 wherein said electronics are mounted on both sides of said printed circuit board assembly.

9. The disk drive assembly of claim 6 wherein said at least one disk is further characterized as comprising more than two disks.

10. The disk drive assembly of claim 6 wherein said vertical thickness of said form factor is approximately 0.350 inches.

11. The disk drive assembly of claim 6 further comprising:

a connector block electrically connected to said electronics, said connector block located in the first end of said enclosure opposite from the at least one disk.

12. The disk drive assembly of claim 11 wherein said connector block is oriented outward from said first end of said enclosure opposite from said at least one disk to mate with an external connector cable to provide interchange of signals between said electronics and a using system in which said disk drive assembly is installed.

* * * * *

UNITED STATES PATENT AND TRADEMARK OFFICE
CERTIFICATE OF CORRECTION

PATENT NO. : 5,886,850
DATED : March 23, 1999
INVENTOR(S) : S. L. Kaczeus et al.

It is certified that error appears in the above-identified patent and that said Letters Patent is hereby corrected as shown below:

On the Title Page

In column 2, after line 5, insert:

--61 151 891   07/1986   Japan--.

In column 2, after line 6, insert:

--2 263 382   10/1990   Japan--.

In column 2, line 10, under "OTHER PUBLICATIONS", delete "Fabricationand" and substitute --Fabrication and-- in its place.

Signed and Sealed this

Eighth Day of May, 2001

Attest:

NICHOLAS P. GODICI

Attesting Officer    Acting Director of the United States Patent and Trademark Office